Nov. 1, 1966  C. F. SMITH ETAL  3,282,643
PHOTOGRAPHIC STRIPPING FILM
Filed June 11, 1962
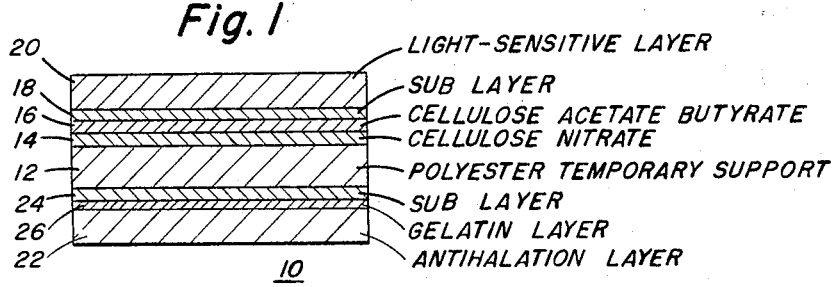
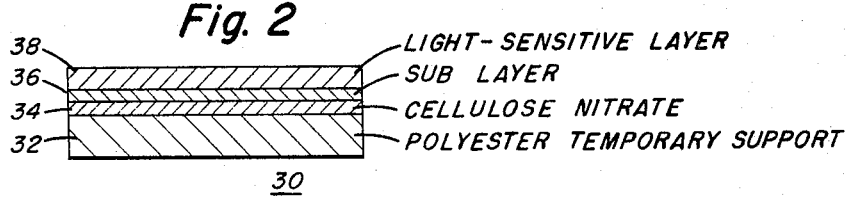
CARL F. SMITH
CLEMENS B. STARCK
GALE F. NADEAU
INVENTORS
BY
ATTORNEYS 3,282,643
PHOTOGRAPHIC STRIPPING FILM
Carl F. Smith, Clemens B. Starck, and Gale F. Nadeau, Rochester, N.Y., assignors to Eastman Kodak Company, Rochester, N.Y., a corporation of New Jersey
Filed June 11, 1962, Ser. No. 201,566
6 Claims. (Cl. 96—83)

This invention relates to photographic stripping film, and particularly, to novel photographic stripping film comprised of a polyester temporary support.

Photographic stripping film is usually comprised of a temporary support, a light-sensitive emulsion coated permanent support, and a stripping layer disposed between the temporary support and the permanent support. After exposure of the photographic film and processing thereof, the temporary support is removed or stripped therefrom. The stripping layer facilitates the removal of the temporary support.

Photographic stripping film is used in photo-engraving and related arts where an image is to be recorded and, after development and fixing, removed from the temporary support and affixed to a transparent plate for the purpose of making photo-engraving plates. The light-sensitive emulsions employed in photographic stripping film are usually of the type that gives an image having a high degree of contrast.

An object of this invention is a photographic stripping film comprised of a polyester temporary support.

Another object of this invention is a photographic stripping film comprised of a polyester temporary support and a permanent support contiguous therewith, there being no conventional stripping layer disposed therebetween.

Other objects of this invention will, in part, be obvious and will, in part, appear hereinafter.

For a complete understanding of the nature and the objects of this invention, reference is made to the following detailed description and drawing, in which:

FIG. 1 is a view in cross-section of a photographic stripping film of this invention, and FIG. 2 is a view in cross-section of another embodiment of the photographic stripping film of this invention.

In accordance with this invention there is provided a novel photographic stripping film comprised of a temporary support which consists of a high molecular weight linear polyester. Suitable polyesters can be prepared by condensing a dihydric alcohol with a dibasic saturated fatty carboxylic acid or derivatives thereof. Suitable dihydric alcohols include glycols wherein the hydroxyl groups are on the terminal carbon atoms and contain from 2 to 12 carbon atoms. Specific examples of dihydric alcohols include ethylene glycol, propylene glycol, trimethylene glycol, hexamethylene glycol, decamethylene glycol, dodecamethylene glycol, and 1,4-cyclohexane dimethanol. Suitable dibasic acids include adipic acid, sebacic acid, decanedioic acid, hexadecanedioic acid, phthalic acid, and terephthalic acid. The alkyl esters of the above acids can be employed also. A particularly suitable high molecular weight linear polyester is polyethylene terephthalate.

Broadly, the photographic stripping film of this invention is comprised of a polyester temporary support and a light sensitive emulsion coated permanent support. The permanent support is in actual contact with or contiguous with the polyester temporary support. Thus, in the make-up of the photographic stripping film of this invention the conventional stripping layer, such as a gelatin layer or a glue layer, is absent.

More specifically, the photographic stripping film of this invention is comprised of (1) a polyester temporary support, the preferred polyester being polyethylene terephthalate, (2) a permanent support comprised of a cellulose nitrate layer and a cellulose acetate butyrate layer, the cellulose nitrate layer being disposed on and in actual contact with a surface of the polyester temporary support, and (3) a light-sensitive layer on the cellulose acetate butyrate layer of the permanent support. To provide for satisfactory adhesion between the light sensitive layer and the composite permanent support, a sublayer such, for example, as a gelatin layer or a gelatin-cellulose nitrate layer is disposed therebetween. A gelatin-cellulose nitrate sub layer will usually consist essentially of, by weight, 68% to 86% of gelatin and 32% to 14% of cellulose nitrate.

In the manufacture of the photographic stripping film of this invention it is preferred to use as the temporary support therefor a fully oriented sheet of polyethylene terephthalate having a thickness of from about 2.5 mils to 7 mils.

The cellulose nitrate is dissolved in a suitable solvent to provide a coatable solution thereof for application to a surface of the polyester temporary support. Solvents for cellulose nitrate are well known and include, for example, acetone, n-butyl acetate, ethylene glycol monomethyl ether, methanol and ethanol. Mixtures of solvents can be employed and are preferred. To improve the coatability of the solution, a small amount of water is incorporated therein. The amount of water employed will usually be from about 2% to 5% by weight based on the total weight of the solution. The cellulose nitrate solution is subsequently applied to a surface of the polyethylene terephthalate support by conventional means such as by roll coating, bead application and the like and the solvent removed therefrom. Heat can be applied to hasten solvent removal.

Prior to the application of the cellulose nitrate layer on a surface of the polyester temporary support there can be incorporated into the cellulose nitrate coating solution an amount of the order of about 40 percent to 80 percent by weight based on the weight of the cellulose nitrate of an adhesion promoter to improve the adhesion of the resulting cellulose nitrate layer to the surface of the polyester temporary support. The amount of adhesion promoter employed in this invention is critical. The use of smaller amounts than that indicated above does not provide any substantial improvement in the adhesion of the cellulose nitrate layer to the surface of the polyester film support to which it is applied. Amounts greater than that above set forth will result in a cellulose nitrate layer that is so firmly bonded to the polyester temporary support that the stripping properties thereof are impaired substantially.

Examples of suitable adhesion promoters include resorcinol, orcinal, catechol, pyrogallol, 1-naphthol, 2,4-dinitrophenol, 2,4,6-trinitrophenol, 4-chlororesorcinol, 2,4-dihydroxy toluene, 1,3-naphthalenedio, 1,6-naphthalenediol, acrylic acid, the sodium salt of 1-naphthol-4-sulfonic acid, benzyl alcohol, trichloroacetic acid, o-hydroxybenzotrifluoride, m-hydroxybenzotrifluoride, o-fluorophenol, m-fluorophenol, p-fluorophenol, chloral hydrate, and o-cresol. Mixtures of two or more adhesion promoters can be employed if desired.

After application of the cellulose nitrate layer to the polyester temporary support there is applied on the cellulose nitrate layer a cellulose acetate butyrate layer. The cellulose acetate butyrate is first dissolved in a suitable solvent or mixture of solvents to provide a coatable solution thereof. Suitable solvents include those set forth hereinabove as solvents for the cellulose nitrate. Water is preferably incorporated into this solution also so as to improve the coating properties thereof. The amount of water employed is the same as that employed in the cellulose nitrate coating solution. The cellulose acetate butyrate solution is applied to the exposed surface of the applied cellulose nitrate layer by conventional methods such, for example, as by roll coating and the solvent removed therefrom. Heat can be applied to hasten the solvent removal, if desired.

While cellulose acetate butyrate is the preferred cellulose ester for this purpose, it is to be understood that other cellulose organic acid esters can be employed, if desired. Examples of suitable cellulose organic acid esters include cellulose acetate, cellulose propionate, and cellulose butyrate.

After application of the cellulose acetate buyrate layer a conventional subbing layer is applied thereto followed by application of a light-sensitive layer. Both applications are accomplished by conventional techniques such for example as by roll coating.

Referring to FIG. 1 of the drawing there is shown a photographic stripping film 10 prepared in accordance with this invention. The photographic stripping film 10 is comprised of a polyester temporary support 12, a layer 14 of cellulose nitrate, a layer 16 of cellulose acetate butyrate, a sub layer 18 which can be, for example, a gelatin layer or a layer comprised of a mixture of cellulose nitrate and gelatin, and a light-sensitive layer 20. The photographic stripping film 10 is also comprised of an antihalation layer 22. This layer can be omitted if desired. The antihalation layer 22 can be a conventional gelatin pelloid containing either dyes or manganese dioxide as absorbent agents. The layer 22 serves also as an anti-curl layer and is preferably of substantially the same thickness as the light-sensitive layer 20. In order to provide for satisfactory adhesion of layer 22 to the polyester temporary support 12, there is disposed therebetween a sub layer 24 and a gelatin sub layer 26. Suitable resins for use in forming sub layer 24 are known in the art. A particularly suitable resin for this purpose is a copolymer of methyl acrylate, vinylidene chloride, and itaconic acid. A specific copolymer for this purpose is comprised of, by weight, about 15% methyl acrylate, 83% vinylidene chloride, and 2% itaconic acid. A small amount of one of the above-enumerated adhesion promoters can be added to the copolymer prior to application thereof to the polyester surface to improve the bonding characteristics thereof. The amount of adhesion promoter employed will be from about .1% to 5% by weight based on the weight of the copolymer. Water is employed as a vehicle or carrier for the copolymer and adhesion promoter when applied to the polyester temporary support. The water is subsequently removed from the applied coating.

Other suitable antihalation layers for application to polyester film supports are disclosed and described in application Serial No. 133,959, filed August 25, 1961. The light-sensitive layer 20 can be any of those employed heretofore in the manufacture of photographic stripping film or can be a layer that has a wider latitude of exposure or the like than comparable layers heretofore used on stripping film bases. The various light-sensitive layers that can be employed will be set forth more fully hereinafter.

While it is preferred that the photographic stripping film be comprised of a permanent support comprised of the above-defined cellulose organic acid ester layer in order to provide a stripping film having highly desirable sensitometric properties, this layer can be eliminated if desired. This embodiment is shown in FIG. 2 of the drawing.

In FIG. 2 of the drawing there is shown a photographic stripping film 30 comprised of a polyester temporary support 32, a permanent support layer 34 of cellulose nitrate, a sub layer 36, and a light-sensitive layer 38. The sub layer 36 can be a conventional sub layer such, for example, as a layer of gelatin or a layer comprised of a gelatin-cellulose nitrate mixture. An anti-halation layer similar to that of FIG. 1 of the drawing can be disposed on the polyester temporary support, if desired.

The following examples are illustrative of this invention.

*Example I*

A fully oriented polyethlene teraphthalate film support having a thickness of about 4 mils is coated with a cellulose nitrate coating composition comprised of, by weight, 3.5 parts of cellulose nitrate, 55 parts of acetone, 5 parts of water, and 36.5 parts of n-butyl acetate. To the applied cellulose nitrate layer, which has a thickness after drying of about 0.15 mil, there is applied a gelatin sublayer and subsequently, a light-sensitive silver halide emulsion layer. Application of the above coatings is accomplished by roll coating techniques.

*Example II*

A photographic stripping film similar to that of Example I is prepared with the exception that there is applied to the cellulose nitrate layer a cellulose acetate butyrate layer from a coating solution comprised of, by weight, about 3.5 parts of cellulose acetate butyrate, about 55 parts of acetone, about 5 parts of water, and about 36.5 parts n-butyl acetate. After drying the applied cellulose acetate butyrate layer has a thickness of about 0.15 mil. Thus, the photographic stripping film product of this example consists of a polyester temporary support carrying thereon a cellulose nitrate layer, a cellulose acetate butyrate layer, a sub layer, and a light-sensitive emulsion layer, in that order.

The photographic stripping film of Example II is exposed and processed in a commercially available developer known in the trade as Kodalith Developer, fixed, washed, and dried. The polyester temporary support is easily and readily removed from the permanent support by stripping it therefrom; however, prior to stripping, it is noted that there is a slight separation of the temporary support from the permanent support at the edge of the stripping film. This separation is referred to in the art as "edge-leaving" and is undesirable in that it results in some distortion of the image formed in the light-sensitive layer. The photographic stripping film of Example I, after exposure and processing, has satisfactory stripping properties. However, edge-leaving similar to that of the Example II stripping film is present.

*Example III*

A photographic stripping film is prepared in a manner similar to that described in Example I with the exception that the cellulose nitrate coating solution employed is comprised of, by weight, about 3.5 parts of cellulose nitrate, about 2.0 parts of resorcinol, about 55 parts of acetone, about 5 parts of water, and about 34.5 parts of n-butyl acetate. The resulting stripping film is exposed and processed in a manner similar to that employed above with reference to the Example II stripping film. There is no noticeable edge-leaving of the processed stripping film, and the polyester temporary support is easily and readily stripped from the cellulose nitrate permanent support. Wet stripping properties of the photographic stripping film are highly satisfactory also.

*Example IV*

A photographic stripping film similar to that of Example III is prepared with the exception that there is applied to the cellulose nitrate layer a cellulose acetate butyrate layer. A cellulose acetate butyrate coating solution similar to that employed in Example II is employed. A sub layer and a light-sensitive silver halide emulsion layer are subsequently applied. The resulting photographic stripping film, after exposure and processing, shows no edge-leaving and the temporary support is easily and readily stripped from the cellulose nitrate permanent support. Wet stripping properties of the stripping film are also good.

Example V

This example illustrates the results obtained when an excess amount of resorcinol is employed in the cellulose nitrate coating solution. A photographic stripping film product similar to that of Example II is prepared with the exception that the cellulose nitrate coating solution is comprised of, by weight, 3.5 parts of cellulose nitrate, 6 parts of resorcinol, 55 parts of acetone, 5 parts of water, and 30.5 parts of n-butyl acetate. The photographic stripping film of Example V is exposed and processed in the conventional manner. After processing, stripping properties of film product are not satisfactory.

While the above examples illustrate certain specific embodiments of this invention, certain changes therein can be made such as in the solvent mixtures used in the application of both the cellulose nitrate layer and the cellulose acetate butyrate layers or the concentration of these cellulose compounds can be varied somewhat. Also, the thickness of the layers can be varied somewhat. It is preferred, of course, to keep the layers as thin as possible and still perform their intended functions.

As set forth above the particular light-sensitive layer that can be coated over the cellulose acetate butyrate layer (preferably the subbed surface thereof) of the novel photographic stripping film product of this invention is not a limitation thereof inasmuch as a large variety of light-sensitive compositions can be employed. In general, it is preferred to employ photographic emulsions of the developing out type. Emulsions containing speed increasing compounds and/or compounds which increase the exposure latitude or the like are particularly satisfactory for use in this invention. Such compositions are described in a number of patents.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al. U.S. Patent 1,623,499, issued April 5, 1927, and Sheppard et al. U.S. Patent 2,410,689, issued November 5, 1946.

The emulsions can also be chemically sensitized with gold salts as described in Waller et al. U.S. Patent 2,399,083, issued April 23, 1946, or stabilized with gold salts as described in Damschroder U.S. Patent 2,597,856, issued May 27, 1952, and Yutzy and Leermakers U.S. Patent 2,597,915, issued May 27, 1952. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents such as stannous salts (Carroll U.S. Patent 2,487,850, issued November 15, 1949), polyamines, such as diethyl triamine (Lowe and Jones U.S. Patent 2,518,698, issued August 15, 1950), polyamines, such as spermine (Lowe and Allen U.S. Patent 2,521,925, issued September 12, 1950), or bis($\beta$-aminoethyl) sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140, issued March 22, 1938; 2,165,338, issued July 11, 1939; 2,493,747, issued January 10, 1950, and 2,739,964, issued March 27, 1956; Brooker and Keyes U.S. Patent 2,493,748, issued January 10, 1950; Sprague U.S. Patents 2,503,776, issued April 11, 1950, and 2,519,001, issued August 15, 1950; Haseltine and Brooker U.S. Patent 2,666,761, issued January 19, 1954; Haseltine U.S. Patent 2,734,900, issued February 14, 1956; Van Lare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,728,664, issued December 27, 1955; and Leubner and Murray U.S. Patent 2,728,665, issued December 27, 1955; the triazoles of Heimbach and Kelly U.S. Patent 2,444,608, issued July 6, 1948; the azaindenes of Heimbach and Kelly U.S. Patents 2,444,605 and 2,444,606, issued July 6, 1948; Heimbach U.S. Patents 2,444,607, issued July 6, 1948 and 2,450,397, issued September 28, 1948; Heimbach and Clark U.S. Patent 2,444,609, issued July 6, 1948; Allen and Reynolds U.S. Patents 2,713,541, issued July 19, 1955 and 2,743,181, issued April 24, 1956; Carroll and Beach U.S. Patent 2,716,062, issued August 23, 1955; Allen and Beilfuss U.S. Patent 2,735,769, issued February 21, 1956; Reynolds and Segal U.S. Patent 2,756,147, issued July 24, 1956; Allen and Segura U.S. Patent 2,772,164, issued November 27, 1956, and those disclosed by Birr in "Z. wiss. Phot.," vol. 47, 1952, pages 2–28; the disulfides of Kodak Belgian Patent 569,317, issued July 31, 1958, the quaternary benzothiazolium compounds of Brooker and Staud U.S. Patent 2,131,038, issued September 27, 1938 or the polymethylene bis-benzothiazolium salts of Allen and Wilson U.S. Patent 2,694,716, issued November 16, 1954; (e.g. decamethylene-bis-benzothiazolium perchlorate); or the zinc and cadmium salts of Jones U.S. Patent 2,839,405, issued June 17, 1958, and the carboxymethyl mercapto compounds of Murray Reynolds and Van Allen U.S. Patent 2,819,965, issued January 14, 1958.

The emulsions may also contain speed-increasing compounds of the quaternary ammonium type of Carroll U.S. Patent 2,271,623, issued February 3, 1942; Carrol and Allen U.S. Patent 2,288,226, issued June 30, 1942; and Carroll and Spence U.S. Patent 2,334,864, issued November 23, 1943; and the polyethylene glycol type of Carroll and Beach U.S. Patent 2,708,162, issued May 10, 1955, or the thio polymers of Graham and Sagel U.S. application Serial No. 779,839, filed December 12, 1958, now U.S. Pat. No. 3,046,124, and Dann and Chechak U.S. application Serial No. 779,874, filed December 12, 1958, now U.S. Pat. No. 3,046,134, or the quaternary ammonium salts and polyethylene glycols of Piper U.S. Patent 2,886,437, issued May 12, 1959.

The emulsions may be hardened with any suitable cizer such as glycerin; a dihydroxy alkane such as 1,5-pentane diol as described in Milton and Murray U.S. application Serial No. 588,951, filed June 4, 1956, now U.S. Pat. No. 2,960,404; an ester of an ethylene bisglycolic acid such as ethylene bis(methyl glycolate) as described in Milton U.S. application Serial No. 662,564, filed May 31, 1957, now U.S. Pat. No. 2,904,434; bis-(ethoxy diethylene glycol) succinate as described in Gray U.S. application Serial No. 604,333, filed August 16, 1956, now U.S. Pat. No. 2,940,854, or a polymeric hydrosol as results from the emulsion polymerization of a mixture of an amide of an acid of the acrylic acid series, an acrylic acid ester and a styrene-type compound as described in Tong U.S. Patent 2,852,386, issued September 16, 1958. The plasticizer may be added to the emulsion before or after the addition of a sensitizing dye, if used.

The tmulsions may be hardened with any suitable hardener for gelatin such as formaldehyde; a halogen-substituted aliphatic acid such as mucobromic acid as described in White U.S. Patent 2,080,019, issued May 11, 1937; a compound having a plurality of acid anhydride groups such as 7,8-diphenylbicyclo-(2,2,2)-7-octene-2,3, 5,6-tetra-carboxylic dianhydride, or a dicarboxylic or a disulfonic acid chloride such as terephthaloyl chloride or naphthalene-1,5-disulfonyl chloride as described in Allen and Carroll U.S. Patents 2,725,294, and 2,725,295, both issued November 29, 1955; a cyclic 1,2-diketone such as cyclopentane-1,2-dione as described in Allen and Byers U.S. Patent 2,725,305, issued November 29, 1955; a bi-ester of methane-sulfonic acid such as 1,2-di-(methane-sulfonoxy)-ethane as described in Allen and Laakso U.S. Patent 2,726,162, issued December 6, 1955; 1,3-dihydroxymethylbenzimidazol-2-one as described in July, Knott and Pollak U.S. Patent 2,732,316, issued January 24, 1956; a dialdehyde or a sodium bisulfite derivative thereof, the aldehyde groups of which are separated by 2–3 carbon atoms, such as $\beta$-methyl glutaraldehyde bis-sodium bisulfite as described in Allen and Burness U.S. patent application Serial No. 556,031, filed December 29, 1955, now abandoned; a bis-aziridine carboxamide such as trimethylene bis(1-aziridine carboxamide) as described in Allen and Webster U.S. patent application Serial No. 599,891, filed July 25, 1956, now U.S. Pat. No. 2,950,197; or 2,3-dihydroxy dioxane as described in Jeffreys U.S. Patent 2,870,013, issued January 20, 1959.

The emulsions used to coat the new stripping film base of the present invention may contain a coating aid such as saponin; a lauryl or oleyl monoether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleoprimarate or a mixture of a water-soluble maleoprimarate and a substituted glutamate salt as described in Knox and Fowler U.S. Patent 2,823,123, issued February 11, 1958; an alkali metal salt of a substituted amino acid such as disodium N-(carbo-p-tert. octylphenoxypentaethoxy)-glutamate as described in Knox and Wilson U.S. patent application Serial No. 600,679, filed July 30, 1956, now U.S. Pat. No. 3,038,804; or a sulfosuccinamate such as tetrasodium N-(1,2-dicarboxyethyl)-N-octadecyl sulfosuccinamate or N-lauryl disodium sulfosuccinamate as described in Knox and Stenberg U.S. patent application Serial No. 691,125, filed October 21, 1957, now U.S. Pat. No. 2,992,108.

The addenda which we have described above may be used in the various kinds of light-sensitive layers applied to our new stripping film base. They may be added to the coating composition before or after any sensitizing dyes which are used. Various silver salts may be used as the sensitive salt such as silver bromide, silver iodide, silver chloride, or mixed silver halides such as silver chlorobromide or silver bromoiodide. The agents may be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

In the preparation of the silver halide dispersions employed for preparing silver halide emulsions, there may be employed as the dispersing agent for the silver halide in its preparation, gelatin or some other colloidal material such as colloidal albumin, a cellulose derivative, or a synthetic resin, for instance, a polyvinyl compound. Some colloids which may be used are polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26% as described in U.S. Patent 2,327,808 of Lowe and Clark, issued August 24, 1943; a water-soluble ethanolamine cellulose acetate as described in Yutzy U.S. Patent 2,322,085, issued June 15, 1943; a polyacrylamine having a combined acrylamide content of 30–60% and a specific viscosity of 0.25–1.5 on an imidized polyacrylamide of like acrylamide content and viscosity as described in Lowe, Minsk and Kenyon U.S. Patent 2,541,474, issued February 13, 1951; zein as described in Lowe U.S. Patent 2,563,791, issued August 7, 1951; a vinyl alcohol polymer containing urethane carboxylic acid groups of the type described in Unruh and Smith U.S. Patent 2,768,154, issued October 23, 1956; or containing cyano-acetyl groups such as the vinyl alcohol-vinyl cyanoacetate copolymer as described in Unruh, Smith and Priest U.S. Patent 2,808,331, issued October 1, 1957; or a polymeric material which results from polymerizing a protein or a saturated acylated protein with a monomer having a vinyl group as described in U.S. Patent 2,852,382, of Illingsworth, Dann and Gates, issued September 16, 1958.

If desired, compatible mixtures of two or more of these colloids may be employed for dispersing the silver halide in its preparation. Combinations of these antifoggants, sensitizers, hardeners, etc., may be used.

It is to be understood that the above description and drawing are illustrative of this invention and not in limitation thereof.

We claim:
1. A photographic stripping film comprised of
   (A) a high molecular weight linear polyester temporary support,
   (B) a permanent support comprised of a layer comprised of cellulose nitrate, said layer comprised of cellulose nitrate being contiguous with a surface of the temporary support, and
   (C) a light-sensitive gelatino-silver halide layer on the permanent support.
2. A photographic stripping film comprised of
   (A) a high molecular weight linear polyester temporary support,
   (B) a permanent support comprised of
      (1) a layer comprised of cellulose nitrate and
      (2)) a layer comprised of a cellulose organic acid ester, said layer comprised of cellulose nitrate being contiguous with a surface of the temporary support, and
   (C) a light-sensitive gelatino-silver halide layer on the permanent support.
3. A photographic stripping film comprised of
   (A) a polyethylene terephthalate temporary support,
   (B) a permanent support comprised of a layer of cellulose nitrate and resorcinol, said layer being contiguous with a surface of the temporary and being derived from a coating composition comprised of cellulose nitrate and from about 40% to 80% by weight, based on the weight of the cellulose nitrate of resorcinol, and
   (C) a light-sensitive gelatino-silver halide layer on the permanent support.
4. A photographic stripping film comprised of
   (A) a polyethylene terephthalate temporary support,
   (B) a permanent support comprised of
      (1) a layer comprised of cellulose nitrate and resorcinol, and
      (2) a layer comprised of cellulose acetate butyrate, said layer (1) being contiguous with a surface of the temporary support and being derived from a coating composition comprised of cellulose nitrate and from about 40% to 80% by weight, based on the weight of the cellulose nitrate of resorcinol, and

(C) a light-sensitive gelatino-silver halide layer on the permanent support.

5. In the method of manufacturing a photographic stripping film, the steps which comprise:
   (1) coating a surface of a sheet of polyethylene terephthalate with a coating composition comprised of cellulose nitrate, a solvent and resorcinol,
   (2) drying the applied coating to provide a layer comprised of cellulose nitrate and resorcinol,
   (3) applying a cellulose acetate butyrate layer to the layer comprised of cellulose nitrate and resorcinol,
   (4) applying a sublayer on the cellulose acetate butyrate layer, and
   (5) applying a light sensitive gelatino-silver halide layer on the sublayer.

6. In the method of manufacturing a photographic stripping film, the steps which comprise:
   (1) coating a surface of a sheet of polyethylene terephthalate with a coating composition comprised of cellulose nitrate, a solvent and resorcinol,
   (2) drying the applied coating to provide a layer comprised of cellulose nitrate and resorcinol,
   (3) applying a sublayer on the layer comprised of cellulose nitrate and resorcinol, and
   (4) applying a light sensitive gelatino-silver halide layer on the sublayer.

References Cited by the Examiner

UNITED STATES PATENTS

| | | | |
|---|---|---|---|
| 2,676,947 | 4/1954 | Parker | 260—75 |
| 2,703,290 | 3/1955 | Scott et al. | 96—87 |
| 2,776,219 | 1/1957 | Hoyt et al. | 96—87 |
| 2,893,896 | 7/1959 | Beeber et al. | 117—118 |
| 2,963,366 | 12/1960 | Kosar et al. | 96—83 |
| 3,035,915 | 5/1962 | Cohen et al. | 96—83 |
| 3,057,722 | 10/1962 | Alles | 96—83 |
| 3,149,973 | 9/1964 | Winchell | 96—83 |

NORMAN G. TORCHIN, *Primary Examiner.*

J. T. BROWN, *Assistant Examiner.*